Dec. 30, 1958    M. KOULICOVITCH ET AL    2,866,301
WARNING DEVICE COMPRISING A MICROPHONE
PREFERABLY FOR A GRINDING MACHINE
Filed March 31, 1953    3 Sheets-Sheet 1

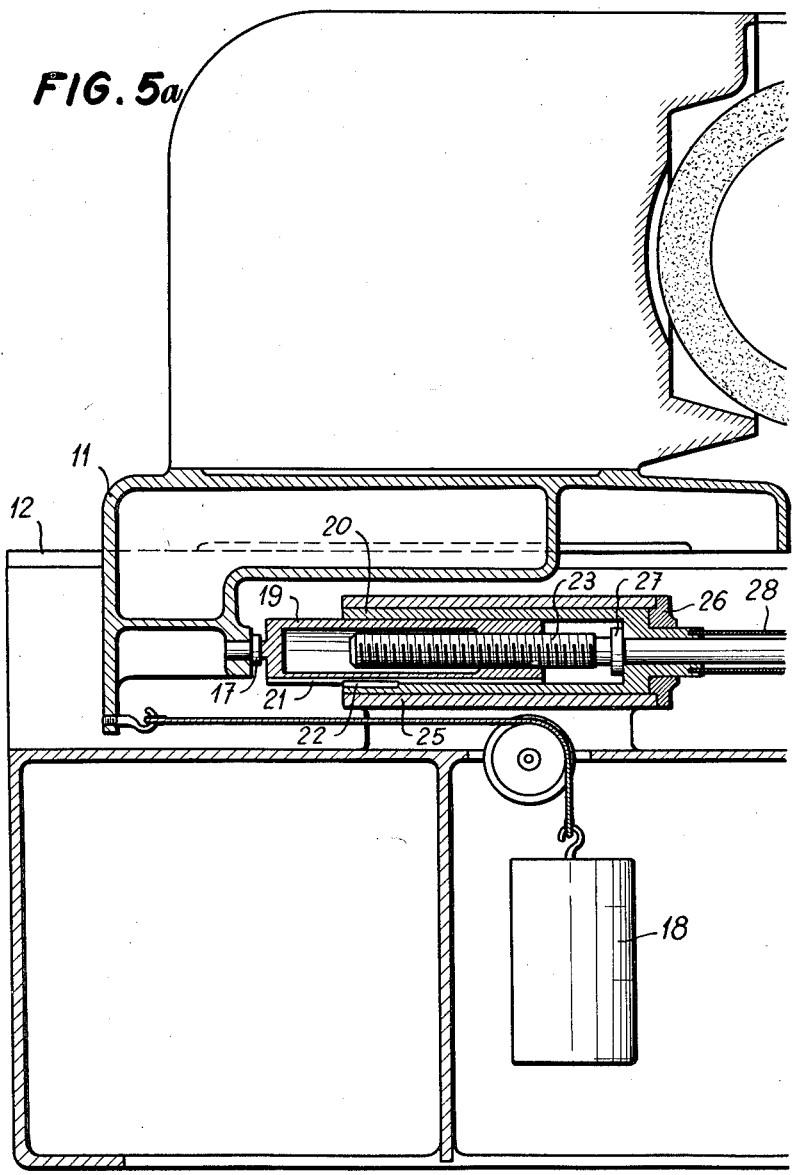

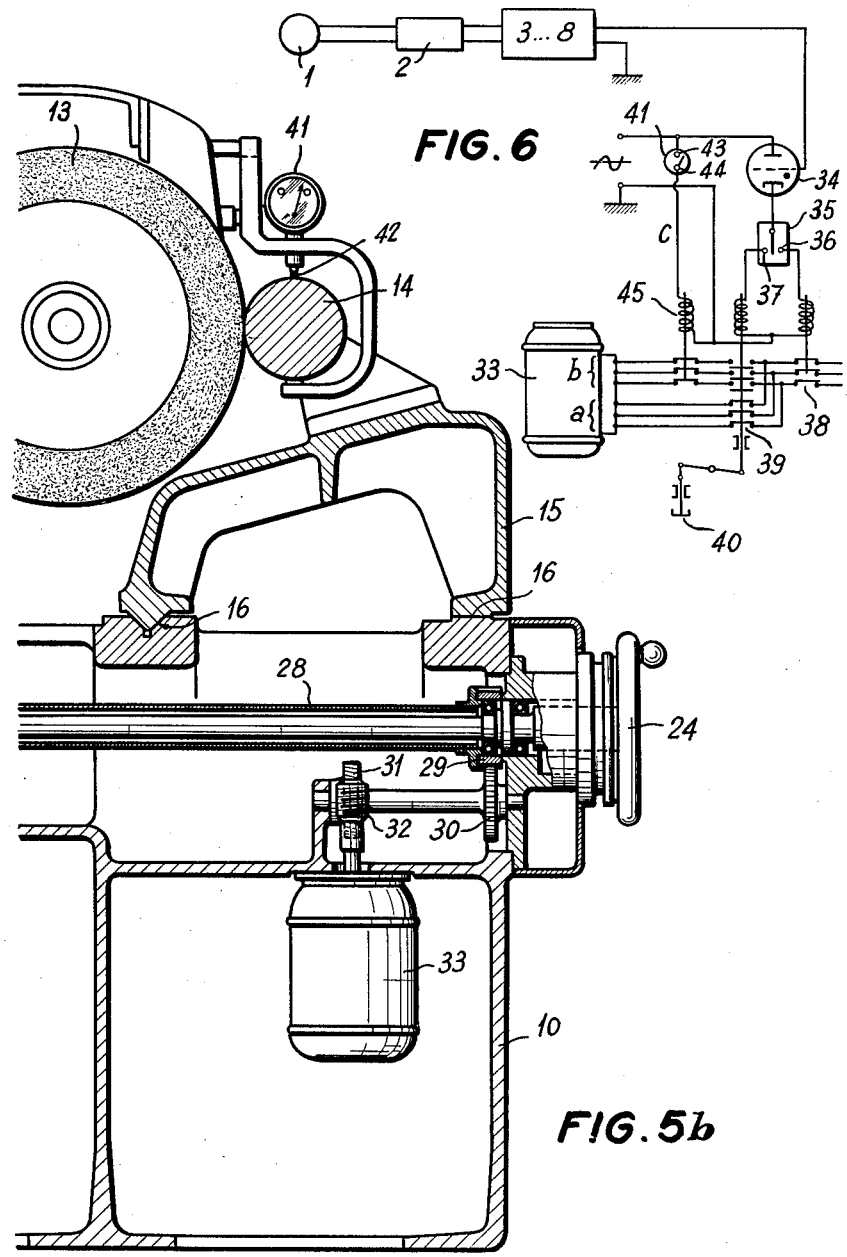

United States Patent Office 2,866,301
Patented Dec. 30, 1958

2,866,301

WARNING DEVICE COMPRISING A MICROPHONE PREFERABLY FOR A GRINDING MACHINE

Maurice Koulicovitch and René Juvet, Geneva, Switzerland, assignors to Societe Genevoise d'Instruments de Physique, Geneva, Switzerland, a firm of Switzerland Application March 31, 1953, Serial No. 345,859

3 Claims. (Cl. 51—165)

The present invention provides for improvements in the operation of machine tools of the chips cutting type and more particularly in the operation of grinding machines.

The object of the present invention is a novel arrangement adapted to be fitted on such machine-tools and which allows ascertaining automatically through the transmission of signals constituted by electric impulses the exact moment at which the tool begins engaging the work to be machined.

During accuracy machining and chiefly in the case of grinding operations, it is highly important to ascertain the moment at which the tool begins to come into contact with the workpiece. This allows defining the exact location of the tool when it begins cutting and also the moment at which it has to begin moving at the speed which it has to assume for the actual machining.

In certain cases, such as the grinding of threads for instance, it is necessary to define the location of the grinding wheel not only radially with reference to the thread but also axially so as to make sure that the wheel is correctly centered with reference to the outline of the thread that has already been roughed in. Such positionings may be obtained only by moving the wheel radially towards the workpiece or by moving axially the workpiece towards the wheel until said wheel touches lightly the workpiece.

The positioning referred to has been hitherto difficult to execute, chiefly in the case of fine pitches and for internal grinding purposes, in which latter case the wheel engages the work at a point escaping observation by the operator.

One of the objects of the arrangement forming the object of my invention is to allow ascertaining automatically and with a high accuracy, the moment at which the tool comes into contact with the workpiece.

A further object of said invention consists in means for stopping automatically the rapid traverse of the tool towards the workpiece at the moment at which it comes into contact with said workpiece.

A still further object of the invention consists in means for automatically starting the provided cutting feed of the tool at the moment at which the latter engages the workpiece.

The present invention is based on the feature that the first shocks exerted by the tool on the workpiece produce a bright high frequency sound the spectrum of which is very different from that of the noises produced by various parts of the machine such as gear wheels, bearings and electric motors, which noises have a lower frequency or are repeated in a more continuous manner. The arrangement according to the invention collects all the noises of the machine inside a microphone which transforms them into electric impulses. Said impulses are then amplified, transformed and selected so as to retain only the signals produced by the vibrations due to the first very light shocks between the tool and the workpiece engaged thereby. Said signals may be examined by means of a suitable reading system, preferably a cathode ray oscilloscope, and they may also be caused to act through the agency of a relay on the means controlling the feeding of the tool.

Accompanying drawing illustrates by way of example the application of the device according to the invention to a grinding machine. In said drawing:

Figs. 5a and 5b are two halves of a cross-section showing the mechanism controlling the travel of the wheel-supporting carriage.

Fig. 6 is a wiring diagram corresponding to said control mechanism.

Figure 1:
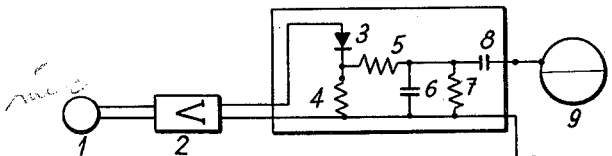
Fig. 1 is a diagram illustrating the amplification, filtering and shaping of the impulses produced by the microphone.
Figure 2:
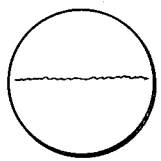
Fig. 2 is a view of the screen of the cathode ray oscilloscope, said screen carrying the curve defined by the luminous spot either before the wheel engages the workpiece or after the wheel has actually entered the material forming the workpiece.
Figure 3:
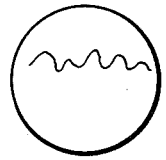
Fig. 3 is another view of the same screen showing the shape of said curve at the moment at which the wheel begins brushing the workpiece.
Figure 4:
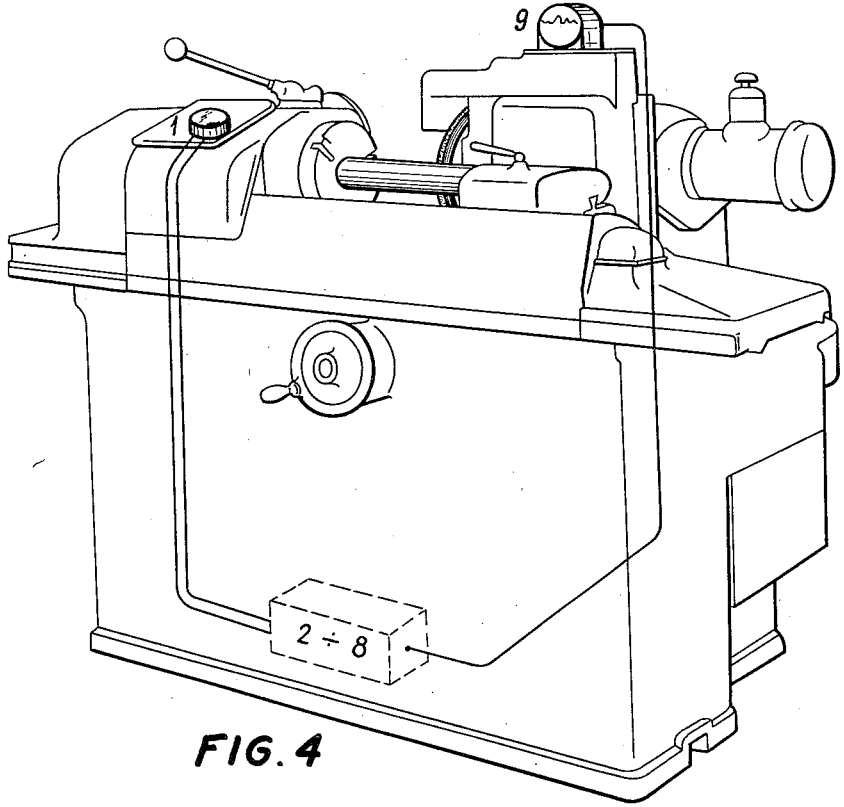
Fig. 4 illustrates an example of a grinding machine provided according to the invention with a microphone, with an electronic system amplifying and shaping the impulses from the latter and with a cathode ray oscilloscope.

Turning to Fig. 1, 1 designates a microphone of the type including a piezo-electric crystal that is sensitive to shrill sounds and is adapted to collect all the noises produced by the machine. It is connected with an electronic amplifier 2 of the usual type generally used for alternating currents, in which the different parts are coupled by means of small capacities. 3 and 4 designate a rectifier and a loading resistance respectively, said rectifier and resistance feeding an integrator including a resistance 5, a condenser 6 and a discharge resistance 7. A discriminating condenser 8 connected with the integrator transmits the signals to be observed onto the screen of a cathode ray oscilloscope 9 of conventional type. For sake of simplicity of the drawing, the usual sources of voltage for operating the oscilloscope and for producing a horizontal scanning by the spot are not illustrated. In the particular case considered, said scanning may be produced simply by an alternating voltage, the frequency of which is equal to that of the mains. The operation of the arrangement is as follows:

The amplifier 2 which receives the impulses transmitted by the microphone weakens the low frequency impulses by reason of the presence of the small connecting capacities and amplifies normally the high frequency impulses which are thereafter polarised by the rectifier 3. The parts 5, 6 and 7 forming the integrator are adjusted in such a manner that above a certain rapidity of repetition the amplified impulses merge into each other and produce in practice continuous signals across the terminals of the condenser 6.

Only impulses that are repeated in an irregular sequence or the rapidity of repetition of which is less than the limit defined by the above rapidity of repetition, such as those produced by the first small shocks between the grinding wheel and the workpiece, produce separate polarised signals across the terminals of the condenser 6. The part to be played by the discriminating condenser 8 consists in stopping all continuous signals and allowing only the separate signals to pass, said signals being then observed as a curve on the oscilloscope 9.

The arrangement disclosed is highly sensitive and as soon as the tool brushes ever so slightly over the workpiece, the curve of the oscilloscope spot assumes immediately a very recognizable look, which is modified again as soon as the tool actually begins working. It is consequently very easy to define with the utmost accuracy the moment at which the tool begins engaging the workpiece, even if the point of engagement is entirely concealed from the sight of the operator.

The signals obtained at the output of the electronic system 3 to 8 may also serve for controlling the progression of the grinding wheel with reference to the workpiece to be ground.

In Fig. 5b, 10 designates the frame of a grinding machine while 11 designates a wheel-supporting carriage sliding over the slideway 12 of the frame. The carriage 11 serves as a support for the grinding wheel 13 the axis of which is perpendicular to the slideways 12. The workpiece to be ground the axis of which is parallel with the axis of the wheel 13 is shown at 14. It is carried by supports, secured to a table 15 sliding along the slideways 16 formed in the frame perpendicularly to the slideways 12. The carriage 11 is provided with a stop 17 which bears, under the action of a counterweight 18, against a nut 19. The latter may slide inside a sleeve 20 in a direction parallel to the slideways 12. A groove 21 provided longitudinally on the outside of the nut 19 is engaged by a key 22 so as to make the nut 19 angularly rigid with the said sleeve 20. A lead-screw 23 rigid with a micrometric hand-wheel 24 controls through engagement with the nut 19 the travel of the carriage 11 towards the right hand side or towards the left hand side, according to the direction of rotation of the lead-screw engaging the nut 19. The sleeve 20 is fitted inside a socket 25 inside which it may revolve causing the rotation of the nut 19. Said socket 25 is rigid with the frame and is provided on the right hand side, as seen in Fig. 5, with a flange 26. The sleeve 20 is held on the right hand side by said flange and on the left hand side by the collar 27 formed on the lead-screw 23. The sleeve 20 is rotated by the hollow shaft 28 controlled in its turn by the gear wheels 29, 30, 31 and 32 which are driven in their turn by an electric motor 33. According to the direction of rotation of said motor, the nut 19, rotating in unison with the sleeve 20 and screwing over the lead-screw 23, is shifted towards the right or towards the left hand side and carries along with it the carriage 11 forming a support for the grinding wheel. Generally the rapid traverse of the wheel towards the workpiece assumes a speed higher than the cutting feed corresponding to the actual grinding operation. It is possible for instance to resort to the mechanical control provided by the motor 33 in order to obtain rapid traverse until the wheel engages the workpiece and thereafter to execute the grinding by hand at the desired feed speed through the micrometric handwheel 24 acting on the lead-screw while the motor 33 and the sleeve 20 remain at a standstill whereby the nut 19 is moved axially. An alternative procedure consists in resorting to mechanical control even during the actual grinding. In this case, the motor 33 may assume at least two speeds, to wit: a rapid traverse speed for approaching the tool towards the workpiece and a slower feeding speed for the actual grinding operation.

Turning to the diagram illustrated in Fig. 6, the impulses produced by the microphone act on the control grid of a relay constituted in the case considered by a Thyratron 34, the electrodes of which are connected respectively with a supply of alternating current and with a switch 35 adapted to be closed over either output terminals 36 and 37. The terminal 36 is connected with an electromagnetic switch 38 which, when it is energized, switches off the current feeding the motor 33. In order to obtain two different speeds, the motor 33 includes a winding $a$ for rapid traverse speed and a winding $b$ for machining or feeding speed. The terminal 37 of the switch 35 is connected with an electromagnetic switch 39 acting on the circuits feeding the winding $a$ and $b$ respectively in a manner such that, for inoperative conditions of said switch, the circuit of the winding $a$ is closed and that of the winding $b$ is open, while the circuit of the winding $a$ is open and the circuit of the winding $b$ is closed when the electromagnet controlling the switch 39 is energized.

It is readily apparent that the connection of the switch blade 35 with the terminal 36 provides for the immediate stoppage of the motor revolving at rapid traverse speed, as soon as the impulses of the microphone act on the Thyratron relay 34, i. e. as soon as the grinding wheel 13 begins engaging the workpiece 14. On the other hand, when the connection of the switch blade 35 is provided with the terminal 37, this provides for energization of the winding $a$ until the impulses from the microphone act on the relay 34. At this moment the electromagnetic switch 39 switches off current from said winding $a$ corresponding to rapid traverse speed and energizes the winding $b$ corresponding to slow operative speed. When the wheel has fully engaged the workpiece 14, the impulses of the microphone cease acting on the relay 34 which consequently switches off the control circuit. Now, the motor should continue rotating at its machining speed so that the wheel continues cutting the workpiece and it is consequently necessary to hold the switch 39 in the position it has just assumed and for which the motor winding $b$ is fed. Any known arrangement may be used to this end, including means providing two stable positions for the switch and reengagement of the latter in its starting position under the action of a pushmember 40.

In Figs. 5b and 6, 41 designates a measuring instrument the feeler 42 of which engages the workpiece 14. When the dimension to be reached for said workpiece is obtained, contact is established between the two terminals 43 and 44 of the instrument and the circuit $c$ closed thereby provides for energization of the electromagnet 45 which switches off the feed of the winding $b$ of the motor 33 corresponding to slow operative movement.

What we claim is:

1. In a grinding machine comprising a grinding wheel, a work-carrier and a sliding carriage for one of said parts, namely the grinding wheel and the work-carrier, an arrangement for warning the operator of the moment of engagement between a workpiece on the carrier and the grinding wheel, comprising a microphone sensitive to the waves produced by the engagement of the workpiece with the grinding wheel and by the operation of the machine, an amplifier fed by the impulses produced by said microphone and adapted to amplify all frequencies above a predetermined frequency value, a rectifier fed by said amplifier, an integrator fed by the rectifier, the integrator being adjusted in such a manner that above a certain predetermined rapidity of reception the amplified and rectified impulses merge into each other producing practically continuous signals of a steady voltage across the output terminals of the integrator, whereas impulses the rapidity of repetition of which is less than the above mentioned predetermined value such as those produced by the first small shocks between the grinding wheel and the workpiece produce separate polarised signals across the output terminals of the integrator, a discriminating condenser fed by the integrator and connected with an electronic receiver, said discriminating condenser stopping all continuous signals and transmitting only the separate signals to the electronic receiver.

2. In a grinding machine comprising a grinding wheel, a work-carrier and a sliding carriage for one of said parts, namely the grinding wheel and the work-carrier, an arrangement for controlling the progression of the grinding wheel with reference to a workpiece, comprising a microphone sensitive to the waves produced by the engagement of the workpiece with the grinding wheel and by the operation of the machine, an amplifier fed by the impulses produced by said microphone and adapted to amplify all frequencies above a predetermined frequency value, a rectifier fed by said amplifier, an integrator fed by the rectifier, the integrator being adjusted in such a manner that above a certain predetermined rapidity of repetition the amplified and rectified impulses merge into each other producing practically continuous signals of a steady voltage across the output terminals of the integrator, whereas impulses the rapidity of repetition of which is less than the above mentioned predetermined value such as those produced by the first small shocks between the grinding wheel and the workpiece produce separate polarised signals across the output terminals of the integrator, a discriminating condenser fed by the integrator and connected with an electronic relay, said discriminating condenser stopping all continuous signals and transmitting only the separate signals to the electronic relay which is controlled by these signals, a circuit controlling the operation of the grinding machine, and means whereby said electronic relay controls said circuit.

3. In a grinding machine comprising a grinding wheel, a work-carrier and a sliding carriage for one of said parts, namely the grinding wheel and the work-carrier, an arrangement for controlling the progression of the grinding wheel with reference to a workpiece, comprising a microphone sensitive to the waves produced by the engagement of the workpiece with the grinding wheel and by the operation of the machine, an amplifier fed by the impulses produced by said microphone and adapted to amplify all frequencies above a predetermined frequency value, a rectifier fed by said amplifier, an integrator fed by the rectifier the integrator being adjusted in such a manner that above a certain predetermined rapidity of repetition the amplified and rectified impulses merge into each other producing practically continuous signals of a steady voltage across the output terminals of the integrator, whereas impulses the rapidity of repetition of which is less than the above mentioned predetermined value such as those produced by the first small shocks between the grinding wheel and the workpiece produce separate polarised signals across the output terminals of the integrator, a discriminating condenser fed by the integrator and connected with an electronic relay, said discriminating condenser stopping all continuous signals and transmitting only the separate signals to the electronic relay which is controlled by these signals, a motor controlling the relative movement between the work-carrier and the grinding wheel, a circuit controlled by the electronic relay, electromagnetic means controlled by last-mentioned circuit upon operation of the relay, and means wherethrough the electromagnetic means control the speed of rotation of the motor.

References Cited in the file of this patent

UNITED STATES PATENTS

| | | |
|---|---|---|
| 1,891,777 | Plimmer | Dec. 20, 1932 |
| 1,893,205 | Hughes | Jan. 3, 1933 |
| 2,023,662 | Blood | Dec. 10, 1935 |
| 2,348,581 | Waldron | May 9, 1944 |
| 2,620,386 | Alspaugh et al. | Dec. 2, 1952 |
| 2,633,678 | Smith | Apr. 7, 1953 |
| 2,698,929 | Greacen et al | Jan. 4, 1955 |